US012052153B2

(12) United States Patent
Branover et al.

(10) Patent No.: US 12,052,153 B2
(45) Date of Patent: Jul. 30, 2024

(54) DYNAMIC FINE GRAIN LINK CONTROL

(71) Applicants: Advanced Micro Devices, Inc., Santa Clara, CA (US); ATI Technologies ULC, Markham (CA)

(72) Inventors: Alexander J. Branover, Chestnut Hill, MA (US); Thomas James Gibney, Newton, MA (US); Michael J. Tresidder, Spicewood, TX (US); Nat Barbiero, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 16/118,848

(22) Filed: Aug. 31, 2018

(65) Prior Publication Data
US 2019/0158374 A1 May 23, 2019

Related U.S. Application Data
(60) Provisional application No. 62/589,826, filed on Nov. 22, 2017.

(51) Int. Cl.
*H04L 43/0876* (2022.01)
*G06F 1/3234* (2019.01)
(Continued)

(52) U.S. Cl.
CPC ........ *H04L 43/0876* (2013.01); *G06F 1/3237* (2013.01); *G06F 1/324* (2013.01);
(Continued)

(58) Field of Classification Search
CPC ............. H04L 43/0876; H04L 41/0813; G06F 1/3237; G06F 1/324; G06F 1/3253; G06F 1/3296; Y02D 10/00
(Continued)

(56) References Cited

U.S. PATENT DOCUMENTS

| 4,677,612 A | 6/1987 | Olson et al. |
| 5,333,267 A | 7/1994 | Sweazey |

(Continued)

FOREIGN PATENT DOCUMENTS

| EP | 1617317 | 1/2006 |
| JP | H10341240 A | 12/1998 |

(Continued)

OTHER PUBLICATIONS

International Search Report and Written Opinion in International Application No. PCT/US2018/052420, dated Jan. 3, 2019, 11 pages.
(Continued)

*Primary Examiner* — Xuan Lu
(74) *Attorney, Agent, or Firm* — Kowert, Hood, Munyon, Rankin & Goetzel, P.C.; Rory D. Rankin

(57) ABSTRACT

Systems, apparatuses, and methods for enabling localized control of link states in a computing system are disclosed. A computing system includes at least a host processor, a communication fabric, one or more devices, one or more links, and a local link controller to monitor the one or more links. In various implementations, the local link controller detects and controls states of a link without requiring communication with, or intervention by, the host processor. In various implementations, this local control by the link controller includes control over the clock signals provided to the link. For example, the local link controller can directly control the frequency of a clock supplied to the link. In addition, in various implementations the link controller controls the power supplied to the link. For example, the link controller can control the voltage supplied to the link.

20 Claims, 8 Drawing Sheets

(51) Int. Cl.
*G06F 1/3237* (2019.01)
*G06F 1/324* (2019.01)
*G06F 1/3296* (2019.01)
*H04L 41/0813* (2022.01)

(52) U.S. Cl.
CPC .......... *G06F 1/3253* (2013.01); *G06F 1/3296* (2013.01); *H04L 41/0813* (2013.01); *Y02D 10/00* (2018.01)

(58) Field of Classification Search
USPC ........................................................ 370/252
See application file for complete search history.

(56) References Cited

U.S. PATENT DOCUMENTS

| | | | |
|---|---|---|---|
| 5,875,176 A | 2/1999 | Sherer et al. | |
| 6,011,798 A | 1/2000 | McAlpine | |
| 6,092,137 A | 7/2000 | Huang et al. | |
| 6,108,345 A | 8/2000 | Zhang | |
| 6,170,025 B1 | 1/2001 | Drottar et al. | |
| 6,205,150 B1 | 3/2001 | Ruszczyk | |
| 6,263,371 B1 | 7/2001 | Geagan, III et al. | |
| 6,269,330 B1 | 7/2001 | Cidon et al. | |
| 6,343,067 B1 | 1/2002 | Drottar et al. | |
| 6,496,938 B1* | 12/2002 | Fry | G06F 1/3203 713/322 |
| 6,584,102 B1 | 6/2003 | Lu | |
| 6,950,886 B1 | 9/2005 | Bailey | |
| 7,984,314 B2* | 7/2011 | Cooper | G06F 1/3228 713/323 |
| 9,467,120 B1* | 10/2016 | Song | H04L 7/0331 |
| 2008/0235528 A1 | 9/2008 | Kim et al. | |
| 2008/0244108 A1* | 10/2008 | Abramson | G06F 21/85 710/16 |
| 2009/0003229 A1 | 1/2009 | Loh et al. | |
| 2009/0158060 A1* | 6/2009 | Vaajala | G06F 1/3203 713/300 |
| 2009/0187778 A1 | 7/2009 | Diab et al. | |
| 2011/0106981 A1* | 5/2011 | Watkins | G06F 13/4221 710/9 |
| 2011/0243032 A1 | 10/2011 | Jenne et al. | |
| 2013/0007483 A1* | 1/2013 | Diefenbaugh | G06F 1/3206 713/320 |
| 2014/0082251 A1* | 3/2014 | Li | G06F 13/4022 710/316 |
| 2014/0223216 A1* | 8/2014 | Cooper | G06F 1/3253 713/324 |
| 2014/0281605 A1 | 9/2014 | Bose et al. | |
| 2017/0068479 A1* | 3/2017 | Chin | G11C 11/4074 |
| 2017/0103332 A1* | 4/2017 | Kumar | H04L 47/125 |
| 2017/0187579 A1 | 6/2017 | Borch et al. | |
| 2017/0269675 A1* | 9/2017 | Klacar | G06F 13/102 |
| 2017/0285726 A1* | 10/2017 | Ito | G06F 1/3287 |
| 2018/0164873 A1* | 6/2018 | Gendler | G06F 1/3296 |
| 2018/0191523 A1* | 7/2018 | Shah | H04B 3/36 |

FOREIGN PATENT DOCUMENTS

WO WO9825381 A1 6/1998
WO WO0077999 A2 12/2000

OTHER PUBLICATIONS

Free On-Line Dictionary of Computing, [entry: 'first-in first-out']. Dec. 6, 1999, https://web.archive.org/web/20050410213048/http://foldoc.doc.ic.ac.uk/foldoc/foldoc.cgi?first-in+first-out. [Retrieved Feb. 19, 2004].

"The HyperTransport™ Technology (HT) I/O Bus Architecture", API Networks, Inc., HyperTransport™ Technology Architecture White Paper, Revision #1002, Jun. 15, 2001, 17 pages.

"HyperTransport™ Technology I/O Link: A High-Bandwidth I/O Architecture", Advanced Micro Devices, Inc., #25012A, Jul. 20, 2001, 25 pages.

* cited by examiner

| Detected Activity 302 | Transition to New Link State if Different from Current State 304 | Power Action associated with New Link State 306 |
|---|---|---|
| High Activity | High Frequency | Set Voltage to Level 1 and clock frequency high |
| Medium Activity | Mid Frequency | Set Voltage to Level 1 and clock frequency to medium |
| Low Activity | Low Frequency | Set Voltage to Level 2 and/or reduce link width |
| Idle – Shorter Time | Clock Off – Low Power | Set Voltage to Level 2 and local clock off |
| Idle – Longer Time | Clock Off – Power Off | Set Voltage to Level 2, reference lock off, local clock off |
| Off | Off – Clock and Power Off | Set Voltage to Level 2, reference lock off, local clock off; Set receive logic off |

FIG. 3

DYNAMIC FINE GRAIN LINK CONTROL

CROSS REFERENCE TO RELATED APPLICATIONS

This application claims priority to Provisional Patent Application Ser. No. 62/589,826, entitled "Method for Dynamic Fine Grain Link Control", filed Nov. 22, 2017, the entirety of which is incorporated herein by reference.

BACKGROUND

Description of the Related Art

Modern processors include a variety of circuits and components to facilitate fast and efficient computation. In addition, circuits and components are included to manage communications between devices, including devices external to the processor. For example, input/output (I/O) controllers are generally included to manage communications with external devices such as display devices, external storage devices, network communications, as well as various other peripheral devices. In order to communicate with these devices, transactions are conveyed from, and received by, processing elements of the processor (e.g., central processing units, graphics processing units, etc.).

In modern processors, many system components are often integrated within a single chip. Such a system is typically referred to as a system on a chip (SoC). In such systems, processors and other components within the system largely communicate with a device to route communications between devices and components within the system. Such a device is sometimes referred to as a data fabric or communication fabric. In one implementation, when conveying data from a processor to an external device, the processor conveys the data via the fabric to an I/O controller. The I/O controller in turn communicates with the target device via a connected link. For example, in various implementations, video data is conveyed via an HDMI link, data is conveyed via a link coupled to a Serial Advanced Technology® Attachment (SATA) device (e.g., a storage device), while other data is conveyed via one or more peripheral component interconnect (PCI, PCIe, etc.) links, and so on.

Typically, a central host device (such as a central processing unit (CPU)) manages the states of various links in the system. For example, in one implementation, the host device controls when a particular link is placed into a lower power state or a higher power state. When using the host device to control the state of links in the system, there is a non-trivial latency between the time the host initiates the transaction to change the state of a given link and the time the link state of the given link is ultimately changed.

BRIEF DESCRIPTION OF THE DRAWINGS

The advantages of the methods and mechanisms described herein may be better understood by referring to the following description in conjunction with the accompanying drawings, in which:

FIG. 3 illustrates a table with various activities that could be detected by a link monitor and actions that could be taken in response to the detected activities.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for enabling localized control of link states in a computing system are disclosed herein. In various implementations, a local link controller detects activity levels and control states of a link without requiring communication with, or intervention by, a host controller. In various implementations, this local control by the link controller includes control over the clock signals provided to the link. For example, the local link controller directly controls the frequency of a clock supplied to a link. In addition, in various implementations, the link controller controls the power supplied to a link. For example, the link controller controls the voltage supplied to the link.

In one implementation, the local link controller monitors an activity level of a plurality of links. The local link controller changes an operational state of a given link without intervention by the host controller responsive to detecting a change in the activity level of the given link over a recent time interval. For example, if the activity level is greater than a first threshold, the local link controller increases the operational state of the given link without intervention by the host controller. If the operational state of the given link is already at the highest operational state, then the local link controller keeps the given link in the highest operational state. Also, if the activity level of the given link is less than a second threshold, then the local link controller decreases the operational state of the given link without intervention of the host controller. If the operational state of the given link is already at the lowest operational state, then the local link controller keeps the given link in the lowest operational state. By operating independently of the host controller, the local link controller is able to make faster changes to the operational state of the given link in response to changing conditions.

Figure 1:
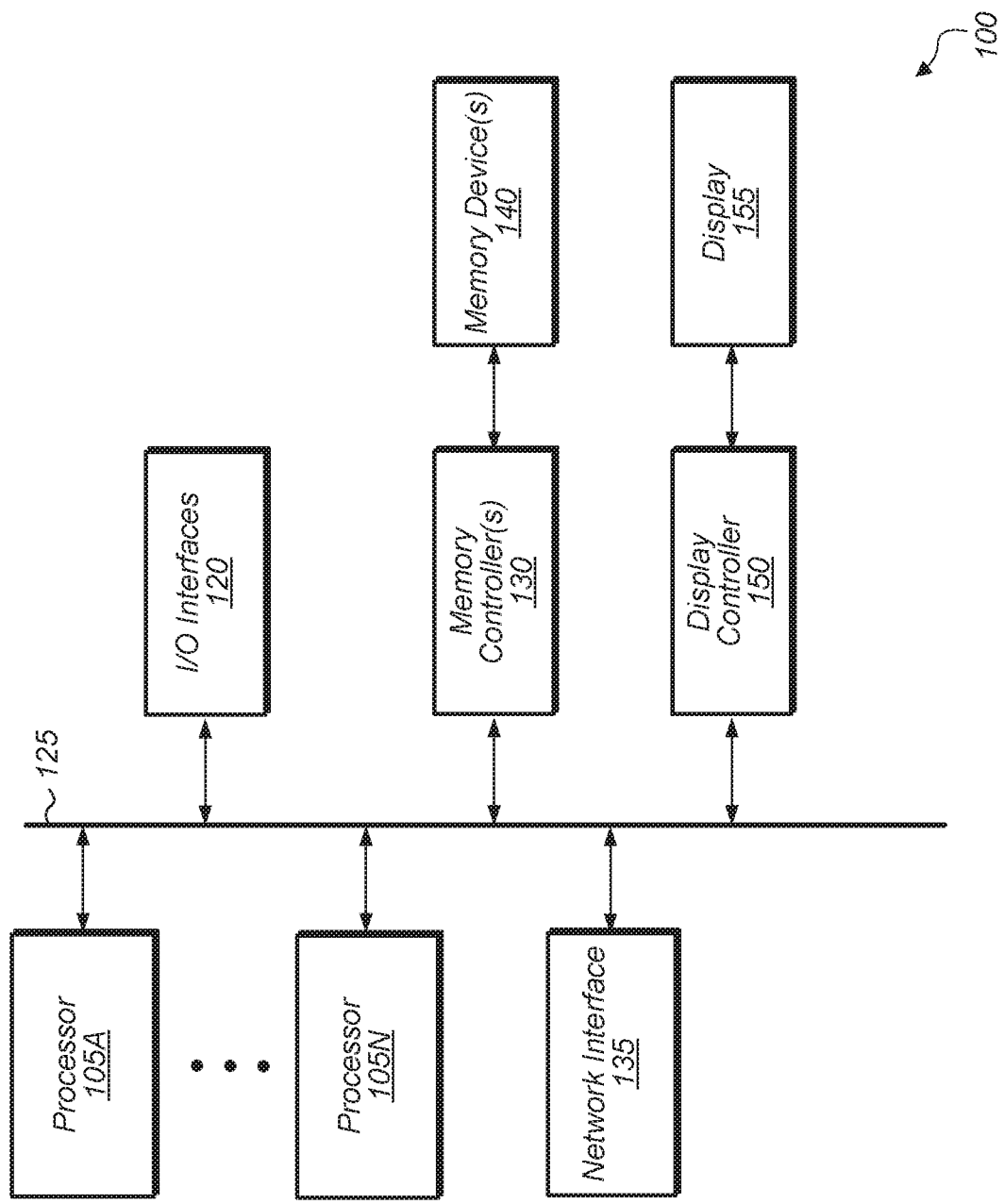
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

Bus 125 is representative of any type of bus or fabric with any number of links for connecting together the different components of system 100. In one implementation, bus 125 includes various numbers of local link controllers for managing links. The local link controllers dynamically and autonomously manage the operational state of links without intervention by processors 105A-N. Each local link controller monitors the link activity of one or more links and adjusts the operational state depending on any changes that are detected in the link activity. Adjusting the operational state includes adjusting the clock frequency supplied to the link, adjusting the voltage supplied to the link, and/or other actions.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
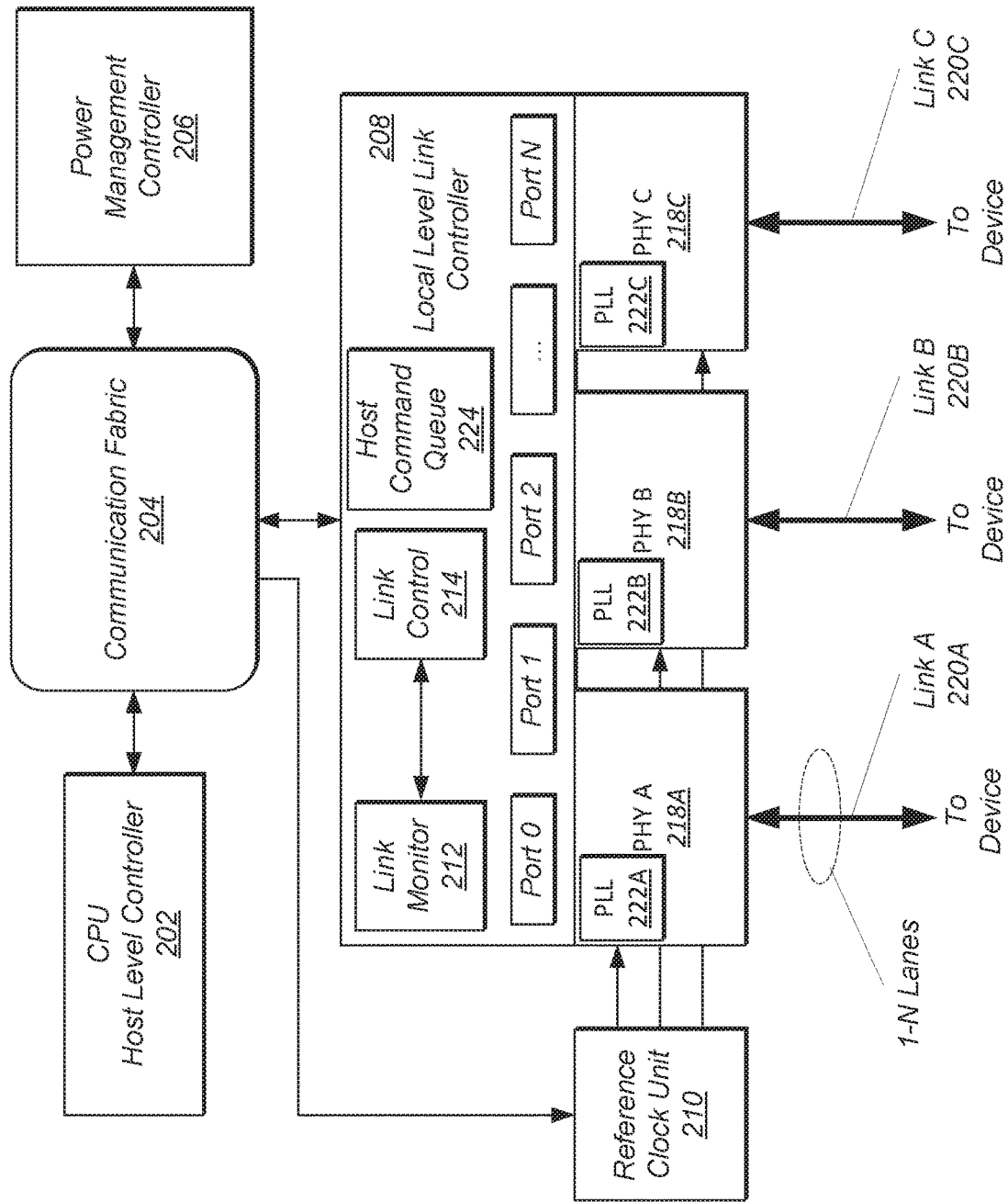
FIG. 2 is a block diagram of one implementation of a system including a link controller configured to directly manage states of one or more links without requiring involvement of a CPU host level controller.

Turning now to FIG. 2, a block diagram of one implementation of a system 200 including a local level link controller 208 directly managing states of one or more links 220A-220C (collectively referred to as links 220) without requiring involvement of a CPU host level controller 202 is shown. In the example shown, a CPU host level controller 202 executes instructions which cause transactions to be conveyed to various devices over the links 220A-220C. Also, CPU host level controller 202 is the target of one or more requests generated by various devices, with the requests reaching CPU host level controller 202 via links 220A-220C. Local level link controller 208 includes circuitry and/or software (e.g., firmware) which exercises local control over the links 220A-220C without the need for involvement of the CPU host level controller 202.

In the implementation shown, the CPU host level controller 202 communicates with the local level link controller 208 via a communication fabric 204. Communication fabric 204 is representative of any bus, crossbar, network, or other mechanism which enables data to be conveyed between the host controller 202 and the local level link controller 208. In various implementations, the communication fabric 204 includes separate command and data paths. In other implementations, a single path is used for conveyance of both commands and data. Both such implementations are contemplated.

Also shown in FIG. 2 is a power management controller 206. In the example shown, the power management controller 206 is coupled to other components in the system 200 via the communication fabric 204. However, as may be appreciated by those skilled in the art, logic represented by the power management controller 206 can be placed elsewhere in a computing system and can communicate with other components in the system via paths other than the communication fabric 204. Generally speaking, the power management controller 206 monitors and/or controls various power-performance states of components within the system 200. Responsive to detecting various events, the power management controller 206 causes other components within the system 200 to either increase or decrease their current power-performance state. In various implementations, changing a power-performance state includes changing a current operating frequency of a device (e.g., one of links 220) and/or changing a current voltage level for a particular device.

The local level link controller 208 of FIG. 2 is shown to include multiple ports (i.e., Port 0, Port 1, . . . , Port N). Also shown are physical layer components 218A-218C (PHYA-PHY C) representing circuitry for transmitting and receiving data via links 220. In the example shown, each link 220 includes one or more lanes for conveying and/or receiving data. In the example shown, the number of ports (N) of the local level link controller 208 is greater than the number of PHYs (3). In such an implementation, one or more of the ports are mapped to each of the PHYs. For example, in one implementation, such a mapping occurs on reset of the system 200. It is noted that the number of ports, PHYs, and links shown is exemplary only. In various implementations, the number of ports, PHYs, and links vary with respect to one another. For example, the number of ports could equal the number of PHYs or be fewer than the number of PHYs.

Similarly, the number of PHYs could be fewer than the number of links (e.g., one PHY covers 4 lanes), and so on. All such implementations are possible and are contemplated.

In FIG. 2, a reference clock unit 210 is shown coupled to each of PHYs 218. In various implementations, circuitry within the local level link controller 208 generates one or more local clock signals based on the clock signal received from the reference clock unit 210. For example, the local level link controller 208 may include one or more phase-locked loops (e.g., PLLs 222A-222C) to generate local clock signals based on the reference clock 210. Also shown as part of the local level link controller 208 are a link monitor 212 and link control unit 214, both of which provide local control over states of the links 220. While depicted as separate units, the functionality provided by each of the link monitor 212 and link control unit 214 could also be combined as part of a single unit. Also shown in the local level link controller 208 is a host command queue 224. In various implementations, the host command queue 224 receives commands from the host 202 that indicate a change in state of one or more of the links 220. In some implementations, the local level link controller 208 detects commands in the queue 224 and takes a responsive action after completion of any tasks that are currently in progress or pending.

During operation, the link monitor 212 tracks activity on the links 220. For example, in some implementations, link monitor 212 monitors and detects the initiation of transactions (e.g., the transmission or receipt of data) on the links, the number of transactions within a given period of time (i.e., the rate of transactions), whether or not a link is currently idle, how long a currently idle link has been idle, and so on. In response to detecting a given activity, in one implementation, the link control unit 214 causes a given link to transition to a new state. In various implementations, the new state corresponds to a state with a given operating frequency and/or voltage level. Additionally, in one implementation, the control unit 214 further causes one or more local clocks and/or reference clock 210 to be disabled or otherwise turned off.

In various implementations, the reference clock unit 210 shown in FIG. 2 is received by one or more clock circuits in the local level link controller 208. In the example shown, PLLs 222A-222C represent the local clock circuits. In various implementations, buffering and/or other circuitry is included in addition to or instead of the PLLs to provide local clock signals within the local level link controller 208. For ease of discussion, the illustrated PLLs 222A-222C are referred to as the local clock circuits or local clock buffers. In some implementations, as discussed above, a given local clock circuit 222A generates one or more local clock signals based on the received reference clock 210. For example, in one implementation, local level link controller 208 includes one or more clock buffers that provide clock signals to multiple links. As one example, one clock buffer in the local level link controller 208 provides a local clock signal to each of two links. For example, in one implementation, one such link is coupled to a solid state storage (SSD) device, and the second link is coupled to a SATA based storage device. Various such implementations are possible and are contemplated.

In some implementations, the local level link controller 208 includes one or more control register(s) for controlling the state of a clock associated with a given port. For example, in some implementations, the register(s) include a field for each port managed by the local level link controller 208. In one implementation, a single bit is used to indicate whether a given port is able to have its clock disabled.

Turning now to FIG. 3, a table 300 with various activities 302 that could be detected by a link monitor and actions 304, 306 that could be taken in response to the detected activities is shown. As shown, if a link monitor (e.g., link monitor 212 of FIG. 2) detects high activity 310 on a given link, such as a rate of transactions exceeding a first threshold, then a link control unit (e.g., link control unit 214) causes the link to transition to a High Frequency state (if not already in that state). As shown, transitioning to the high frequency state causes a local clock associated with the link to operate at a relatively high frequency and the voltage for the link is set to a relatively high voltage level among operating voltage levels for the link (referred to as Voltage Level 1 in the illustration).

If the link monitor detects a medium level of activity 312 on a given link, such as a rate of transactions being below the first threshold but exceeding a second threshold, then the link control unit causes the link to transition to a Mid Frequency state (if not already in that state). As shown, transitioning to the mid frequency state causes a local clock associated with the link to operate at a frequency lower than the high frequency and the voltage for the link is set to the relatively high voltage level among operating voltage levels for the link (referred to as Voltage Level 1 in the illustration).

If the link monitor detects a low level of activity 314 on a given link, such as a rate of transactions being below the second threshold but the link not being idle, then the link control unit causes the link to transition to a Low Frequency state (if not already in that state). As shown, transitioning to the low frequency state causes a voltage for the link to be set to a voltage level lower than the high voltage level. Alternatively, or additionally, an action is taken to reduce the width of the link. For example, in one implementation, if the full link width is 64 bytes, then a width of the link is reduced to 32 bytes while maintaining the current clock rate. Alternatively, the clock rate could be reduced as well.

If the link monitor detects that a given link is idle and that is has been idle for a "short" period of time 316, then the link control unit causes the link to transition to a lower voltage state (if not already in that state) and a local clock to the link is turned off. In various implementations, detecting that a link is idle for a short period of time includes determining that the link has been idle for less than a "low" threshold amount of time. In such a case, the threshold amount of time is fixed or programmable as desired. In various implementations, the local level link controller (e.g., local level link controller 208) maintains a counter that tracks how long a given link is idle. If activity is detected on the link, the counter is reset. A variety of such mechanisms to detect and monitor the idle state of a link are possible and are contemplated. If a link is detected to have been idle for more than a threshold amount of time 318 (where the threshold is either the same or greater than the above discussed "low" threshold), then the local level link controller causes the link to transition to the lower voltage state (if not already in that state), the local clock to the link is turned off, and the reference clock is turned off. Finally, if the link is detected to be disconnected or otherwise not presently configured for operation 320, then the local level link controller causes the link to transition to the lower voltage state (if not already in that state), the local clock to the link is turned off, the reference clock is turned off, and receive logic associated with the link is powered off. The receive logic is powered off as no data is anticipated to be received via that link.

Figure 4:
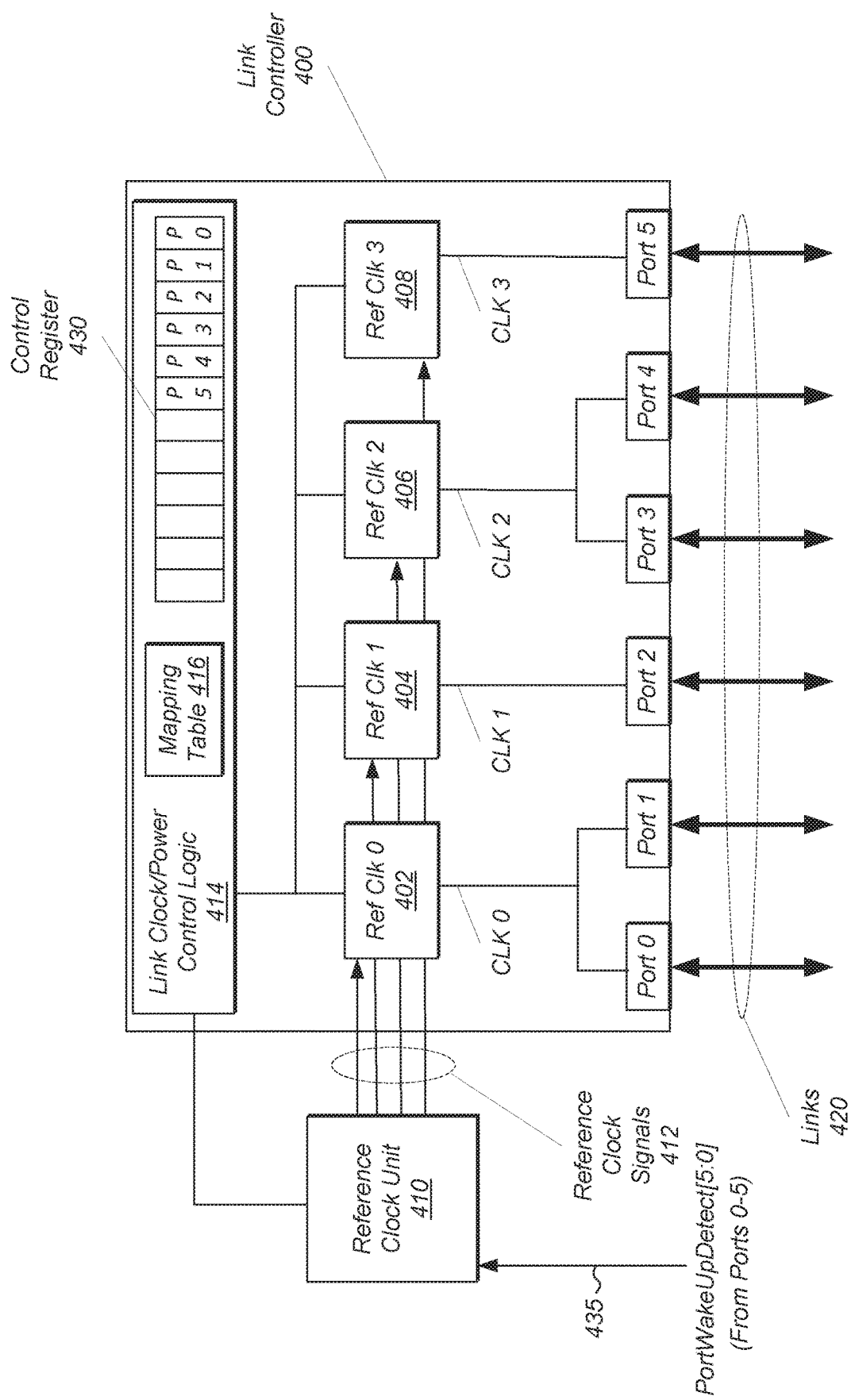
FIG. 4 is a block diagram of one implementation of a link controller that includes a control register for use in controlling the local clocks and power provided to links.

Turning now to FIG. 4, a block diagram of one implementation of a link controller 400 that includes a control register 430 for use in controlling the local clocks and power provided to links 420 is shown. In the example shown, a reference clock unit 410 provides a reference clock signal 412 to each of four local clock units (402, 404, 406, 408). Each of the local clock units 402-408 generates a clock signal based on the received reference clock 412. In the example shown, reference clock unit 402 provides a local clock signal to Port 0 and Port 1, reference clock unit 404 provides a local clock signal to Port 2, reference clock unit 406 provides a local clock signal to Port 3 and Port 4, and reference clock unit 408 provides a local clock signal to Port 5. In various implementations, the number of local clock units, ports, and how they are mapped to one another varies. Also shown are signals 435 provided from Ports 0-5 to the reference clock unit 410. In various implementations, these signals 435 provide an indication of activity on a given port to the reference clock unit 410. In this manner, the reference clock unit 410 manages the clocks (402-408) provided to the ports separately and as needed for given ports P0-P5.

In addition to the above, a control register 430 is shown that includes a field corresponding to each of the ports. While other fields can also be present in the register 430, a field for each of ports P0-P5 is shown. In one implementation, link clock/power control logic 414 reads and/or writes values to the control register 430. In one implementation, when it is determined that a given link is to be enabled or disabled (as discussed above in FIGS. 2 and 3), the control logic 414 stores a value in a field of the control register 430 that indicates a state (or possible state) of a corresponding port and/or link. For example, in one implementation, a value is stored in a field of the control register 430 to indicate whether a corresponding port can be enabled or disabled. In one implementation, the value stored is a single bit. The values stored in the register 430 are then used by the logic 414 to determine whether a local clock (i.e., CLK0-CLK3) can be disabled, whether the reference clock unit 410 can be disabled, and/or whether a power-performance state of a port or link can be changed (e.g., by increasing or reducing a voltage and/or frequency).

For example, using the illustrated example, reference clock unit 402 generates a local clock—CLK 0. CLK 0 is provided to both Port 0 and Port 1. In one implementation, the mapping between clocks and ports is stored in mapping table 416. With knowledge of the mapping of the ports to the local reference clock units (e.g., as determined on reset by accessing mapping table 416), the control logic 414 determines when reference clock unit 402 can be disabled. For example, logic 414 determines that reference clock unit 402 can be disabled if both Port 0 and Port 1 are determined to be idle and/or disconnected based on the mappings stored in mapping table 416. In the example shown, if both of the fields P0 and P1 in the control register 430 indicate that the ports can be disabled due to an idle or disconnected state, the logic 414 determines that reference clock unit 402 can be disabled and then causes reference clock unit 402 to be disabled. In various implementations, the logic 414 implements functionality described in the table of FIG. 3. Accordingly, a voltage level of the links associated with Port 0 and Port 1 is reduced to a relatively low level. Similarly, logic 414 determines that one of reference clock units 404-408 is able to be disabled if all of the ports serviced by the corresponding reference clock unit are either idle or disconnected. Further, if the logic 414 determines that all local clocks can be disabled, then all reference clock units 402-408 are disabled and the reference clock unit 410 is also disabled.

In some implementations, logic 414 also receives indications from a power management unit (e.g., power management controller 206 in FIG. 2) regarding various power management states for the system. Responsive to such power management indications, the logic 414 alters or overrides a determination made locally regarding whether a local clock unit is enabled or disabled, whether the reference clock 410 is enabled or disabled, whether and how to change a voltage provided to various circuitry, and so on.

Figure 5:
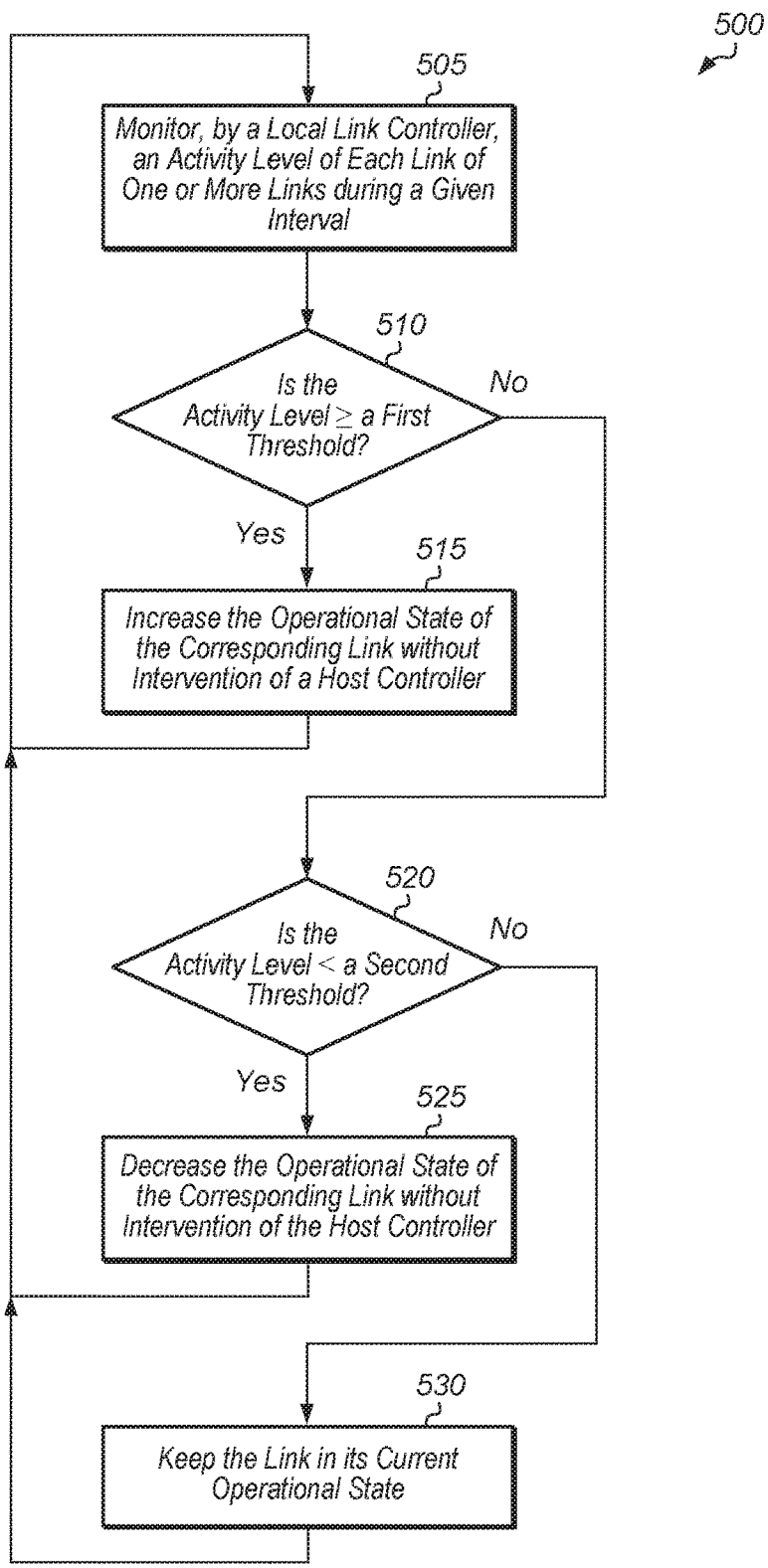
FIG. 5 is a generalized flow diagram illustrating one implementation of a method for a local link controller autonomously and dynamically managing states of link components.
Figure 6:
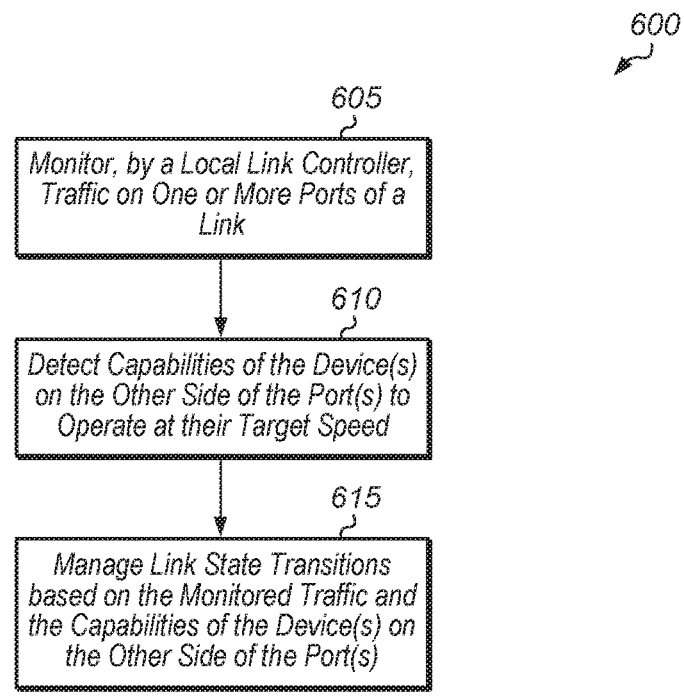
FIG. 6 is a generalized flow diagram illustrating one implementation of a method for managing link-state transitions.
Figure 7:
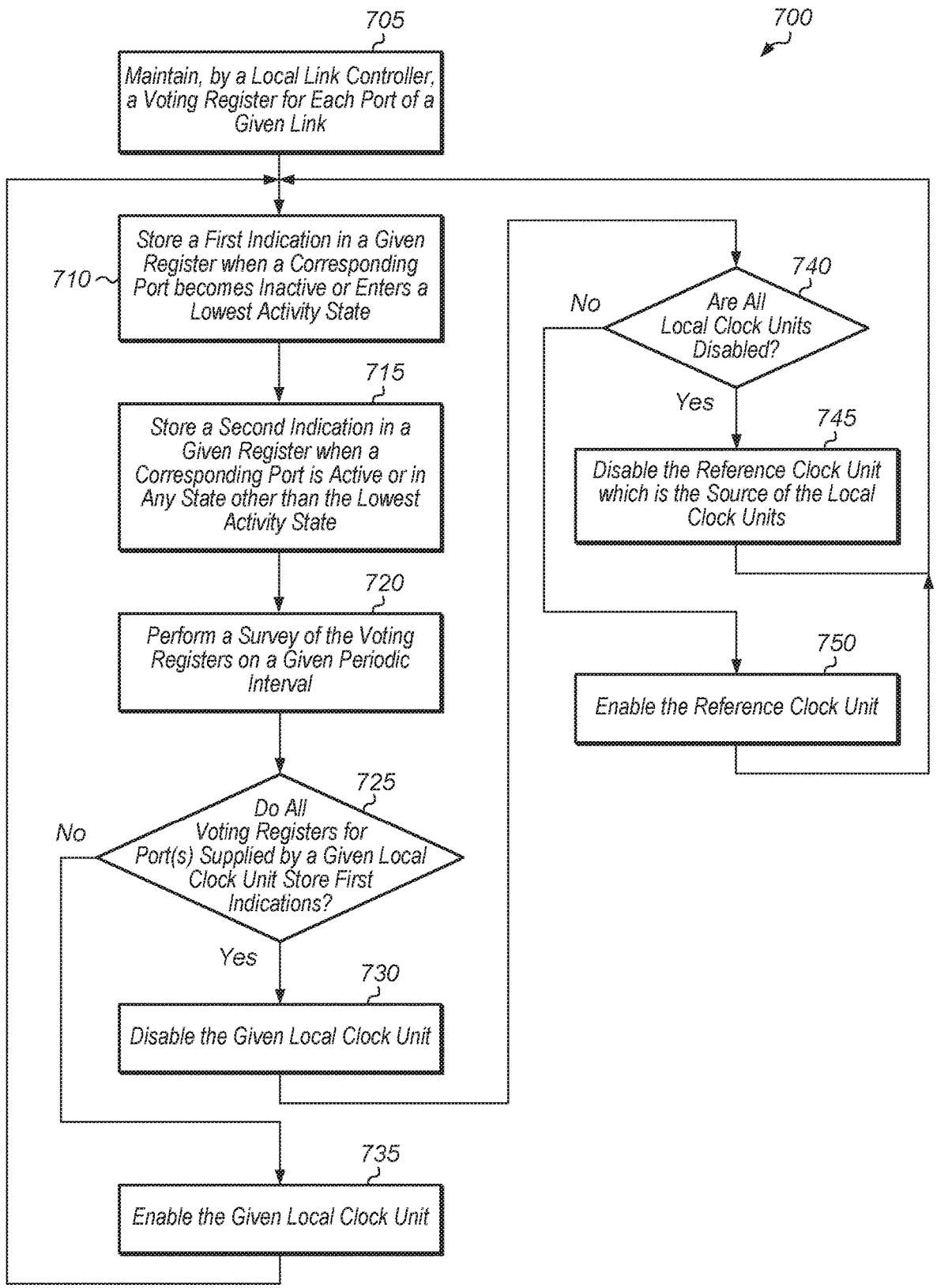
FIG. 7 is a generalized flow diagram illustrating one implementation of a method for implementing local clock unit voting registers.
Figure 8:
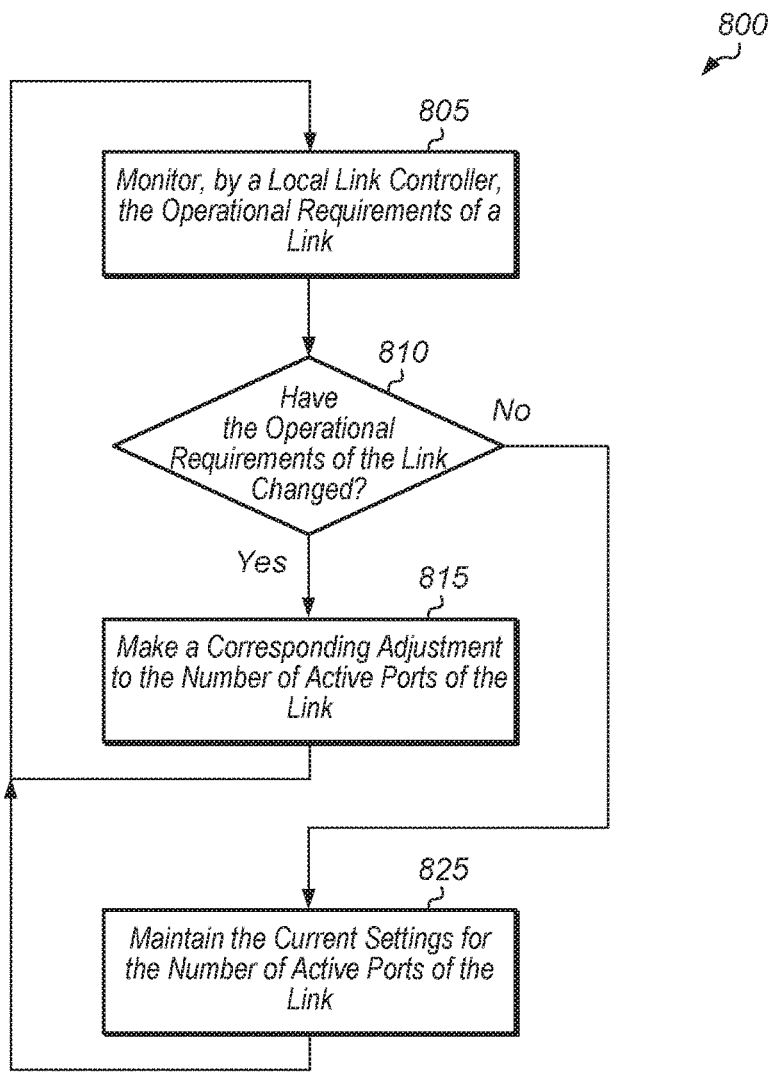
FIG. 8 is a generalized flow diagram illustrating one implementation of a method for a local link controller dynamically and autonomously adjusting the number of active ports of a link.

Referring now to FIG. 5, one implementation of a method 500 for a local link controller autonomously and dynamically managing states of link components is shown. For purposes of discussion, the steps in this implementation and those of FIG. 6-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A local link controller monitors an activity level of each link of one or more links during a given time interval (block 505). In various implementations, monitoring the activity level of each link involves monitoring the number of packets traversing the link during the given interval, monitoring the devices at the other side of the link, monitoring power status data on the devices and/or clock reference units, and/or other actions. For each link, if the activity level is greater than or equal to a first threshold (conditional block 510, "yes" leg), then the local link controller increases the operational state of the corresponding link without intervention of a host controller (block 515). In other words, the local link controller makes and implements the decision to increase the operational state of the corresponding link without getting any input from the host controller and without getting the approval of the host controller. If the operational state of the corresponding link is already at the highest operational state, then the local link controller keeps the link in the highest operational state. If the activity level is less than the first threshold (conditional block 510, "no" leg), then the local link controller determines if the activity level of the link is less than a second threshold (conditional block 520).

If the activity level of the link is less than the second threshold (conditional block 520, "yes" leg), then the local link controller decreases the operational state of the corresponding link without intervention of the host controller (block 525). If the operational state of the corresponding link is already at the lowest operational state, then the local link controller keeps the link in the lowest operational state. If the activity level is greater than or equal to the second threshold (conditional block 520, "no" leg), then the local link controller keeps the link in its current operational state (block 530). After blocks 515, 525, and 530, method 500 returns to 505. It is noted that the steps 510-530 can be performed in parallel for each link of the one or more links.

Turning now to FIG. 6, one implementation of a method 600 for managing link-state transitions is shown. A local link controller (e.g., local level link controller 208 of FIG. 2) monitors traffic on one or more ports of a link (block 605). In one implementation, monitoring traffic involves counting the number of packets that traverse a given port during a given interval. The local link controller also detects the capabilities of the device(s) on the other sides of the port(s) to operate at their target speed (block 610). For example, the local link controller is able to monitor and/or receive signals related to the states of the devices on the other sides of the ports. In one implementation, the local link controller receives information from the power management controller (e.g., power management controller 206 of FIG. 2) regarding the power states of components on the other side of the port(s). Next, the local link controller manages link state transitions based on the monitored traffic and capabilities of the device(s) on the other side of the port(s) (block 615). For example, if a device on the other side of a given port is turned off or in a low-power state, the local link controller is able to be more aggressive in reducing the operational state of the given link. After block 615, method 600 ends.

Referring now to FIG. 7, one implementation of a method 700 for implementing local clock unit voting registers is shown. A local link controller maintains a voting register for each port of a given link (block 705). The local link controller stores a first indication in a given register when a corresponding port becomes inactive or enters a lowest activity state (block 710). The local link controller stores a second indication in a given register when a corresponding port is active or in any state other than the lowest activity state (block 715). Also, the local link controller performs a survey of the voting registers on a given periodic interval (block 720). It is noted that the duration of the periodic interval varies according to the implementation.

For each local clock unit of the given link, if all voting registers for port(s) supplied by a given local clock unit store first indication(s) (conditional block 725, "yes" leg), then the local link controller disables the given local clock unit (block 730). Otherwise, if one or more voting register(s) for port(s) supplied by the given clock unit store a second indication (conditional block 725, "no" leg), then the local link controller enables the given local clock unit or keeps the given local clock unit enabled if it is already on (block 735). After block 730, if all of the local clock units are disabled (conditional block 740, "yes" leg), then the local link controller disables the reference clock unit which is the source of the local clock units (block 745). Otherwise, if one or more of the local clock units are enabled (conditional block 740, "no" leg), then the local link controller enables the reference clock unit or keeps the reference clock unit enabled it is already on (block 750). After blocks 735, 745, and 750, method 700 returns to block 710.

Turning now to FIG. 8, one implementation of a method 800 for a local link controller dynamically and autonomously adjusting the number of active ports of a link is shown. A local link controller monitors the operational requirements of a link (block 805). In one implementation, the operational requirements of the link refer to the bandwidth requirements of the link. In one implementation, the local link controller monitors the operational requirements of the link by tracking the traffic on the link. For example, in one implementation, the local link controller tracks the number of packets traversing the link.

If the local link controller detects a change in the operational requirements of the link (conditional block 810, "yes" leg), then the local link controller makes a corresponding adjustment to the number of active ports of the link (block 815). For example, if the bandwidth requirements of the link have decreased, then the local link controller decreases the number of active ports of the link. Also, in another implementation, if the bandwidth requirements of the link have decreased, then the local link controller reduces the lane width of the link. Alternatively, if the bandwidth requirements of the link have increased, and one or more ports are currently disabled, then the local link controller increases the number of active ports. In another implementation, if the bandwidth requirements of the link have increased, then the local link controller increases the lane width of the link if the lane width is not already at its maximum setting. If the local link controller does not detect a change in the operational requirements of the link (conditional block 810, "no" leg), then the local link controller maintains the current settings for the number of active ports of the link (block 825). After block 825, method 800 returns to block 805. It is noted that in one implementation, method 800 is repeated on a periodic basis.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system for providing local control of a link state, the system comprising:
   a central host controller comprising circuitry; and
   a local link controller comprising:
   a plurality of ports, each associated with a separate link and a local clock circuit of a plurality of local clock circuits;
   a plurality of voting registers including a separate voting register for each of the plurality of ports, wherein each of the plurality of voting registers is configured to store an indication specifying whether a local clock circuit associated with a corresponding port can be disabled; and
   circuitry configured to disable a given local clock circuit of the one or more local clock circuits in response to:
   one or more voting registers of the plurality of voting registers storing an indication that a local clock circuit can be disabled; and
   stored mapping data that maps each of the plurality of ports to a local clock circuit of the plurality of local clock circuits indicates that the one or more voting registers represent all voting registers corresponding to the given local clock circuit.

2. The system as recited in claim 1, wherein the system further comprises a communication fabric, wherein:
   the central host controller comprises a processor configured to execute instructions which cause transactions to be conveyed to a plurality of devices over a plurality of links via one or more ports of the plurality of ports; and
   the local link controller is configured to:

communicate with the central host controller via the communication fabric; and communicate with the plurality of devices via the plurality of links.

3. The system as recited in claim 1, further comprising a reference clock circuit configured to convey a reference clock signal to each of the plurality of local clock circuits, wherein the system is configured to disable the reference clock circuit responsive to all of the plurality of local clock circuits being disabled.

4. The system as recited in claim 3, wherein each of the plurality of local clock circuits comprises circuitry configured to:

generate a local clock signal based on the reference clock signal; and convey the local clock signal to a corresponding port.

5. The system as recited in claim 1, wherein to change an operational state of a given link between a first operational state that enables transmitting data on the given link and a second operational state that disables transmitting data on the given link, the local link controller is configured to change at least one of an operating frequency of the given link, a voltage supplied to the given link, and a lane width of the given link.

6. The system as recited in claim 1, wherein the local link controller is further configured to periodically poll the plurality of voting registers.

7. The system as recited in claim 1, wherein the local link controller is further configured to:

prevent disabling of the given local clock circuit, in response to the stored mapping data indicating the one or more voting registers do not represent all voting registers corresponding to the given local clock circuit.

8. A method comprising:

maintaining, by circuitry of a local link controller, a plurality of voting registers including a separate voting register for each port of a plurality of ports, each associated with a separate link and a local clock circuit of a plurality of local clock circuits, wherein each of the plurality of voting registers is configured to store an indication specifying whether a corresponding port can be disabled;

disabling, by the circuitry of the local link controller, a given local clock circuit of the one or more local clock circuits in response to:

one or more voting registers of the plurality of voting registers storing an indication that a local clock circuit can be disabled; and stored mapping data that maps each of the plurality of ports to a local clock circuit of the plurality of local clock circuits indicates that the one or more voting registers represent all voting registers corresponding to the given local clock circuit.

9. The method as recited in claim 8, further comprising:

executing instructions, by a central host controller, which cause transactions to be conveyed to a plurality of devices over a plurality of links; via one or more ports of the plurality of ports communicating, by the local link controller, with the central host controller via a communication fabric; and communicating, by the local link controller, with the plurality of devices via the plurality of links.

10. The method as recited in claim 8, further comprising changing, by the local link controller, an operational state of a given link between a first operational state that enables transmitting data on the given link and a second operational state that disables transmitting data on the given link by changing at least one of an operating frequency of the given link, a voltage supplied to the given link, and a number of active ports of the given link.

11. The method as recited in claim 8, further comprising disabling a reference clock circuit configured to provide a clock signal to each of the plurality of local clock circuits, in response to all of the plurality of local clock circuits being disabled.

12. The method as recited in claim 8, further comprising:

generating, by each of the plurality of local clock circuits of the local link controller, a local clock signal based on a received reference clock signal; and conveying, by each of the plurality of local clock circuits, the local clock signal to one or more ports of the plurality of ports.

13. The method as recited in claim 8, further comprising periodically polling the plurality of voting registers by the local link controller.

14. The method as recited in claim 8, further comprising:

preventing disabling of the given local clock circuit by the local link controller, in response to the stored mapping data indicating the one or more voting registers do not represent all voting registers corresponding to the given local clock circuit.

15. An apparatus comprising:

a plurality of ports, each associated with a separate link and a local clock circuit of a plurality of local clock circuits;

a plurality of voting registers including a separate voting register for each of the plurality of ports, wherein each of the plurality of voting registers is configured to store an indication specifying whether a local clock circuit associated with a corresponding port can be disabled; and circuitry configured to disable a given local clock circuit of the one or more local clock circuits in response to:

one or more voting registers of the plurality of voting registers storing an indication that a local clock circuit can be disabled; and stored mapping data that maps each of the plurality of ports to a local clock circuit of the plurality of local clock circuits indicates that the one or more voting registers represent all voting registers corresponding to the given local clock circuit.

16. The apparatus as recited in claim 15, further comprising an interface configured to be coupled to a communication fabric, wherein the circuitry is further configured to:

communicate, via the communication fabric, with a central host controller comprising a processor configured to execute instructions which cause transactions to be conveyed to a plurality of devices via the plurality of ports.

17. The apparatus as recited in claim 15, wherein the circuitry is further configured to initiate a change of an operational state of a given link coupled to a port of the plurality of ports, responsive to further detecting, based on indications received from a power management controller, capabilities of a given device coupled to the given link.

18. The apparatus as recited in claim 15, wherein each of the plurality of local clock circuits is configured to:

generate a local clock signal based on a reference clock signal; and convey the local clock signal to one or more ports of the plurality of ports.

19. The apparatus as recited in claim 18, wherein the circuitry is further configured to periodically poll the plurality of voting registers.

20. The apparatus as recited in claim 15, wherein the circuitry is further configured to:

prevent disabling of the given local clock circuit, in response to the stored mapping data indicating the one or more voting registers do not represent all voting registers corresponding to the given local clock circuit.

\* \* \* \* \*